J. T. HOLLY.
VEHICLE HUB.
APPLICATION FILED FEB. 21, 1911.
1,008,268.
Patented Nov. 7, 1911.
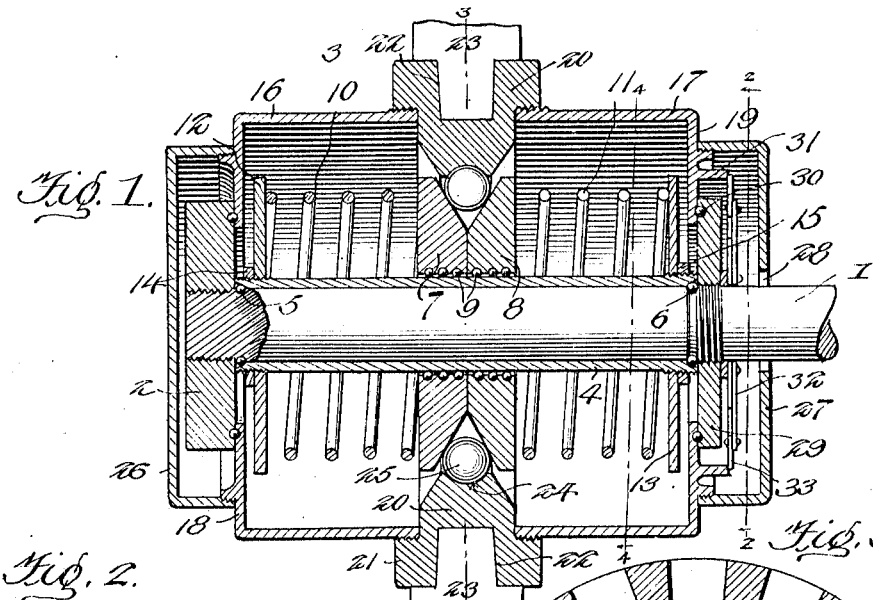
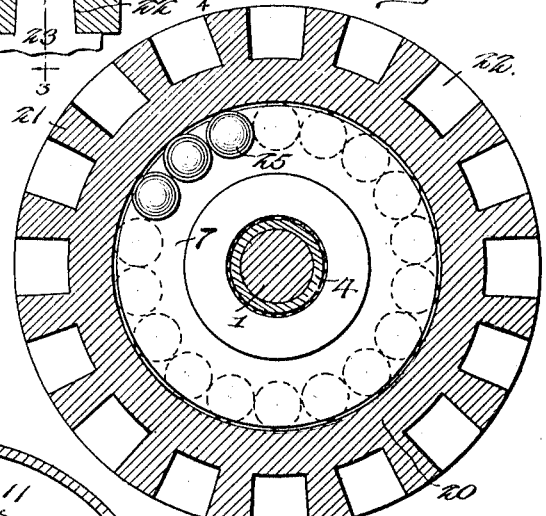
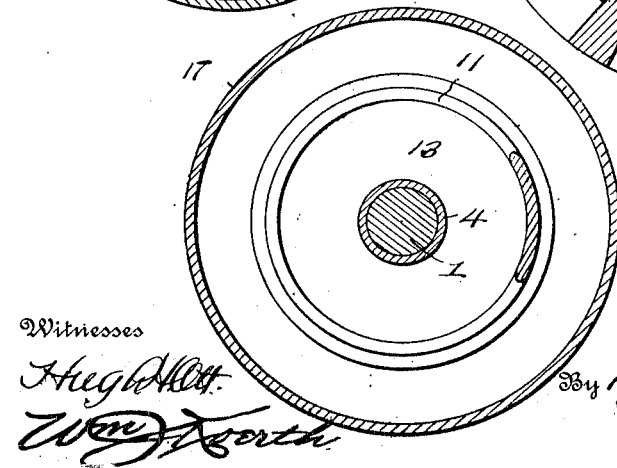
Inventor
John T. Holly
By Victor J. Evans
Attorney
Witnesses

UNITED STATES PATENT OFFICE.

JOHN T. HOLLY, OF WABBASEKA, ARKANSAS.

VEHICLE-HUB.

1,008,268.

Specification of Letters Patent. Patented Nov. 7, 1911.

Application filed February 21, 1911. Serial No. 609,857.

*To all whom it may concern:*

Be it known that I, JOHN T. HOLLY, a citizen of the United States, residing at Wabbaseka, in the county of Jefferson and State of Arkansas, have invented new and useful Improvements in Vehicle-Hubs, of which the following is a specification.

This invention relates to a novel construction of vehicle hubs, more especially designed for motor carriages, or automobile vehicles, but applicable to other kinds of road vehicles, carriages bicycles or trucks, and by which a hub is provided with means for affording within itself a non-rigid or yieldable support for the outer parts of the body of the wheel and which, while normally maintaining the plane of the wheel perpendicular with the axis, will permit limited resilient vibration of the said wheel plane without strain or shock upon the axial parts.

Another object of the invention is the provision of a wheel provided with a flattened or non-resilient tire, with a spring hub which will impart to the said wheel the same resilent qualities as one provided with a pneumatic tire, the said hub being adapted to take up shocks, jars and inequalities of the road and at the same time allowing the free rotation of the wheels upon its axle.

With the above objects in view, and others which will appear as the description progresses, the invention resides in the novel construction and arrangement of parts as will be hereinafter fully described and claimed.

Reference is to be had to the accompanying drawings which form a part of this specification and in which.

Figure 1 is a central longitudinal sectional view taken through a hub constructed in accordance with the present invention. Fig. 2 is a sectional view upon the line 2—2 of Fig. 1. Fig. 3 is a similar sectional view upon the line 3—3 of Fig. 1. Fig. 4 is a similar view upon the line 4—4 of Fig. 1.

In the accompanying drawing the numeral 1 designates a vehicle axle. This axle 1 has its outer extremity threaded in the usual manner and is adapted for the reception of a nut 2.

The numeral 3 designates the improved hub. This hub is centrally provided with what may be termed a skein or cylinder core 4, the same being loosely mounted for rotation upon the axle 1 and the said skein is provided adjacent its ends with suitable raceways which are adapted to aline with similar raceways provided by the axle, and the said raceways are adapted for the reception of anti-frictional balls 5 and 6.

Arranged centrally upon the skein 4 is a pair of beveled disk members 7 and 8. These members are beveled from their outer peripheries toward their meeting faces, and the central bore of each of the members is provided with suitable anti-frictional bearings designated by the numeral 9.

The numerals 10 and 11 designate a pair of helical springs. These springs are adapted to bear against the outer disk members 7 and 8. The tension of the said springs is regulated through the medium of suitable nuts 12 and 13, which are threadedly connected with the skein 4. The numerals 14 and 15 designate lock nuts which are also threadedly connected with the skein 4 and which are adapted to sustain the nuts 12 and 13 in a proper adjusted position, so that the tension of the springs may be readily regulated with relation to the disks 7 and 8.

16 and 17 designate the housings for the device. These housings are preferably circular in cross section and have their outer edges provided with downturned flanges 18 and 19. Both of these flanges terminate a suitable distance away from the nuts 12 and 13 as well as from the springs 10 and 11 and the said housings are spaced a suitable distance apart adjacent their ends to accommodate the combined spoke retainer and ball race designated by the numeral 20. This member 20 is rigidly secured to the housings 16 and 17 in any desired manner and has its outer face enlarged as at 21 so as to overlie both of the housings 16 and 17. The central portion of the said enlargement is provided with openings or depressions 22, the latter being adapted for the reception of spokes 23. The portion of the member 20 projecting within the housings is formed with an annular depression 24, and this depressed portion is positioned intermediate of the beveled disks 7 and 8. The annular depression 24 is adapted for the reception of anti-frictional balls 25, the said balls also bearing between the beveled faces of the disks 7 and 8.

The numerals 26 and 27 designate the dust caps which are attached to the flanged portions of the housings 16 and 17. The inner dust cap 27 is centrally provided with an opening 28 through which the axle 1 projects and the said cap 27 is adapted to serve as a housing for the joints connecting the hub with the axle.

The numeral 29 designates a nut member which is connected with the axle 1 in any desired manner. This member 29 has its inner face flattened and provided with an angular raceway adapted for the reception of anti-frictional balls 30, the said balls bearing against the flange 19 of the housing 17 and the nut 2 is likewise provided with anti-frictional balls which bear against the flange 18 of the housing 16. This housing 17 is provided with a plurality of outwardly extending arms 31 and pivotally connected with each of the said arms is a strap 32. Each of the straps 32 are pivotally connected with larger straps 33 and the said larger straps may be secured to the axle 1 or to the central portion of the nut 29 as desired.

Having thus fully described the invention, what I claim as new, is:—

The combination with an axle, of a skein loosely mounted upon the axle, a pair of disks having beveled inner faces and anti-frictional bearings upon the skein, a helical spring bearing against the outer face of each of the disks, members adjustably mounted upon the skein for regulating the tension of the springs, locking elements for these members, a combined spoke retainer and ball race surrounding the disks, anti-frictional bearings between this member and the beveled portions of the disks, housings connected with the spoke retainer and ball race and inclosing the remaining elements, a pair of members securely connected with the axle, dust caps for the housings, one of the housings being provided with a plurality of projecting arms, a strap pivotally connected with each of the arms, a second strap pivotally connected with the first strap, and a pivotal connection between the last-named straps and the axle.

In testimony whereof I affix my signature in presence of two witnesses.

JOHN T. HOLLY.

Witnesses:
M. C. KILPATRICK,
MARY DOBSON.